United States Patent [19]

Mateo Herrero

[11] Patent Number: 5,931,994

[45] Date of Patent: Aug. 3, 1999

[54] PAINT COMPOSITION WITH INSECTICIDAL AND ANTI-ARTHROPODICIDAL PROPERTIES FOR CONTROLLING PESTS AND ALLERGENS BY INHIBITING CHITIN SYNTHESIS

[76] Inventor: Maria Pilar Mateo Herrero, Plaza de España no. 5, Valencia, Spain, 45007

[21] Appl. No.: 08/995,132

[22] Filed: Dec. 19, 1997

[30] Foreign Application Priority Data

Dec. 23, 1996 [ES] Spain ...................... 9602723

[51] Int. Cl.$^6$ ...................................... C09D 5/14
[52] U.S. Cl. ...................... 106/15.05; 424/408; 424/409; 424/419
[58] Field of Search ..................... 424/408, 419, 424/78.09, 409; 106/15.05

[56] References Cited

U.S. PATENT DOCUMENTS 4,464,317  8/1984  Thies et al. .............................. 264/4.3
5,229,122  7/1993  Chadwick et al. ....................... 424/408

FOREIGN PATENT DOCUMENTS 1291296   10/1991  Canada .
0 235 584  9/1987  European Pat. Off. .
2 593 821  2/1986  France .
1447305    8/1976  United Kingdom .
2027346    2/1980  United Kingdom .

Primary Examiner—Robert H. Harrison
Attorney, Agent, or Firm—Henry M. Feiereisen

[57] ABSTRACT

A paint composition for controlling pests and allergens through inhibiting chitin synthesis, includes a mixture of 10 to 40% by weight of water, 5 to 50% by weight of resin, 0.001 to 40% by weight of a chitin inhibitor, 0.001 to 5% by weight of an organophosphate, 1 to 40% by weight of pigment, 1 to 60% by weight of a carrier material, and 1 to 20% by weight of a stabilizer, wherein the weight percentages are based on the total weight of the mixture.

8 Claims, No Drawings

PAINT COMPOSITION WITH INSECTICIDAL AND ANTI-ARTHROPODICIDAL PROPERTIES FOR CONTROLLING PESTS AND ALLERGENS BY INHIBITING CHITIN SYNTHESIS

BACKGROUND OF THE INVENTION

The present invention refers to a paint composition which is useful as an insecticide and in controlling pests and which is non-toxic to humans and pets. The paint composition is used in the control of pests such as for example, insects, mites and other organisms including those implicated in the transmission of endemic diseases such as malaria or paludism and other common diseases and also those causing allergies. The paint composition of the invention effectively inhibits synthesis of chitin in arthropods and similar organisms during all stages of the biological cycle from egg to adult; additionally, the paint composition acts as a sterilizing agent for adult females.

More particularly, the invention relates to a paint composition which comprises, resins, pigments, a carrier and active compounds which are micro-encapsulated in resin polymer during the manufacturing process. Micro-encapsulation of the active compound in the paint composition provides the paint composition specifically with a residual insecticidal activity and thus continued effectiveness of the applied paint composition against arthropods and similar organisms.

Paints having insecticidal properties are known in the prior art, under the name Artilin, disclosed in the following patents: European Patent No. 871011308-2, French Pat. No. 8601516, U.S. Pat. No. 010300, Canadian Pat. No.528968.

However, the active compounds of the prior art paint compositions are not of the 'new generation' type paints disclosed here, in part also because the prior art paint constituents contain active compounds such as for example, organo-chlorides which under EU regulation, are prohibited for use as pest control and as insecticides The toxic nature of organo-chlorides to warm blooded animals which includes humans has been demonstrated and is well known. Moreover, these compounds are known to be harmful to the environment.

Certain insecticidal paints traditionally used for that purpose currently on the market are formulated having pyrethroids as a basis, but their active compounds exhibit little of the specific residual efficacy which is a characteristic of the paint composition of the invention. While these traditionally formulated paints can exhibit immediate activity as insecticide, they lose their efficacy soon thereafter because they are subject to degradation by light and other environmental influences, in part due to their low photostability.

SUMMARY OF THE INVENTION

It is thus an object of the present invention to provide an improved paint composition with insecticidal properties, obviating the afore-stated drawbacks.

In particular, it is an object of the present invention to provide an improved paint composition with insecticidal properties, which is most effective as an insecticide and for use in pest control, while yet being non-toxic to humans and pets and having residual properties against organisms implicated in and causing endemic diseases such as malaria, paludism and other common diseases widespread in modern societies including those that cause allergies.

It is a still another object of the invention to provide a simple and healthy way of an insecticide for controlling pests such as insects, mites and others.

It is a further object of the invention to provide an improved paint composition which effects protection for humans and warm blooded animals against arthropods, and is easy applied, while yet being washable, odorless, non-toxic and a non-irritant to humans and pets and which has negative mutation indices, and which has a long lasting anti-arthropod property due to its residual property.

These objects and others which will become apparent hereinafter are attained in accordance with the present invention by providing a paint composition which includes a mixture of 10 to 40% by weight of water, 5 to 50% by weight of resin (for example vinyl, acrylic) 0.001 to 40% by weight of a chitin inhibitor, 0.001 to 5% by weight of an organophosphate, 1 to 40% by weight of pigments, 1 to 60% by weight of a carrier material, and 1 to 20% by weight of a stabilizer, wherein the weight percentages are based on the total weight of the composition.

The paint composition of the present invention comprises resin, pigments carrier and active compounds which are micro-encapsulated in a resin polymer. The composition acts on pests by inhibiting the synthesis of chitin a body building polysaccharide found in arthropod species. Advantageously, the paint composition acts selectively on target pest within the ecosystem. Furthermore, the paint composition acts as an acaricidal, bactericidal, fungicidal and insecticidal disinfectant; it also acts as a chemical sterilizing agent for susceptible mites, specifically, adult females. The paint composition's insecticidal and pest controlling properties are active on direct contact but in addition, the paint composition also acts as an inhibitor of chitin synthesis, the polysaccharide that generally forms part of the outer body of insects and other arthropods.

Applied in an interior environment, the paint composition controls flies, mosquitoes, spiders, mites, cockroaches, ants, bedbugs, lice, moths and other arthropods to name a few. Applied in exterior environments, the paint composition is specially developed and formulated to prevent and control the formation of spider webs and the proliferation of insects under eaves and protrusions of roofs, and other points of preferred penetration by pests.

The paint composition has an excellent resistance to weathering and decay by atmospheric agents and is formulated to be applied on any type of substrate such as for example, concrete, iron, wood, prefabricated materials and others too numerous to mention here. One of the preferred application of the paint composition is indicated for the control of insects and pests that penetrate through walls and roofs regardless of the material from which they may be made.

The paint composition of the invention is very effective against those insects which hide and lay their eggs in the cracks, crevices and rough spots in house walls.

DETAILED DESCRIPTION OF THE INVENTION

Chitin inhibitors are categorized in the group of the so called growth regulating insecticides G.R.I. which act on chitin, a major component of the so called tegmentum of the insect. The tegmentum is a rigid exoskeleton covering insects which protects them from outside forces, prevents water loss and is generally needed for survival of the insect. During its developmental stages growth of the insect occurs in discontinuous fashion, in that the tegmentum is periodically shed and gradually replaced when a new larger size tegmentum grows. This process is known as molting. In application, the paint composition or the active compound which is a constituent of the paint causes a process whereby the mechanism of chitin synthesis is inhibited. The blockage of chitin synthesis in turn blocks the formation of a new tegmentum which in turn inhibits the molting process thereby blocking further development of the insect and consequently its viability.

The constituents and the effective amounts thereof making up the insecticidal and disinfectant paint composition is shown in the following formulation table:

TABLE 1

| Ingredient | Amounts | | |
|---|---|---|---|
| Water | 10% | to | 40% |
| Chitin inhibitor | 0.001% | to | 40% |
| Organophosphates | 0.001% | to | 5% |
| Resin | 5% | to | 50% |
| Pigments | 1% | to | 40% |
| Carrier | 1% | to | 60% |
| Stabilizers | 1% | to | 20% |

The active constituents of paint composition are in addition to pigments, carriers and stabilizers, a small percentage of organophosphate compounds and chitin inhibitors which are micro-encapsulated in the polymer resin and which provide the paint composition with its residual potency and thus greater effectiveness.

All constituents shown are expressed as percent weight by total weight of the composition, and may be combined in any variation within the above shown percentage ranges.

Activity of the paint composition or that of its active constituent is effective during all developmental stages of the insect from egg to the mature organism. Thus, for example, in one species the eggs will be affected when laid on plant leaves that have been treated with active compound or when the eggs are treated with active compound after they were laid. While the eggs so treated might be capable of developing to the stage of larvae, they are incapable of emerging properly and die shortly afterwards.

The active compound affects the organism when already in the larval stage by preventing molting which gives rise to a number of symptoms such as double cephalic capsule, swelling of the thorax or displacement or deformation of the mandibles. Because molting is thus prevented, the larvae are incapable of developing into the subsequent stages of development and due to their aforementioned malformations cannot feed properly thereby making their survival impossible. If contact with the active compound in the paint composition is not instantly lethal to the organism, soon after ingestion, further feeding ceases due to the lethal effect of the active compound. Larvae which have been exposed to sublethal doses of the active compound may develop into a pupae but will subsequently fail to develop into a viable adult or will give rise to adults which produce far fewer eggs than normal adults. Thus, adult organisms are affected by reducing their fertility. The paint composition acts both by ingestion as well as on contact, with ingestion leading to a faster accumulation of a lethal dose within the organism.

The preferred chitin inhibitors for use in the paint composition are flufenoxuron, fenoxycarb, hexithiazox, diflubenzuron, hexaflumuron, triflumuron, or hydroprene which are all commercially available. The chitin inhibitor is micro-encapsulated in the polymer resin by known methods which provides the paint composition with residual potency and therefore longer lasting effectiveness.

The usual stabilizers used in plastic paints such as sodium benzoate, sodium hexametaphosphate, sodium nitrite and similar are used in the formulation of the paint composition The organophosphates of the paint composition are of the type ethyl chlorpyridylphosphate, 0,0-diethyl and 0-(3, 5, 6-trichloro-2-pyridyl) thiophosphate, 0,0-diethyl 0-(2-isopropyl-6-methyl-pyrimidin-4-ethyl) phosphorothioate type, which are broad-spectrum acaricides-insecticides, belonging to the organophosphate family and which act through ingestion, on contact and by inhalation, due to their vapor action. While the organophosphates have a low systematic activity, their volatility make them effective beyond the areas of direct application.

Pigment constituents are of the titanium dioxide type. The carrier constituents are calcium carbonates. The resins are acrylic or vinyl based emulsions. The organophosphates used in the formulation of the paint composition are technical grade products employed in the formulation of insecticides and also used in the environmental health and food hygiene fields. When applied in various forms, these compounds are active against a variety of pests, among others mosquitoes, flies, beetles, ants, cockroaches and mites. When properly applied the aforementioned compounds provide a long term effect in pest control lasting up to a year. Toxicity and efficacy tests have been successfully carried out with the paint composition.

While the invention has been illustrated and described as embodied in a paint composition with insecticidal and anti-arthropocidal properties by inhibiting chitin synthesis, it is not intended to be limited to the details shown since various modifications and structural changes may be made without departing in any way from the spirit of the present invention.

What is claimed as new and desired to be protected by Letters Patent is set forth in the appended claims:

1. A paint composition for controlling pests and allergens through an inhibitor of chitin synthesis, comprising a mixture of 10 to 40% by weight of water, 5 to 50% by weight of resin, 0.001 to 40% by weight of a chitin inhibitor, 0.001 to 5% by weight of an organophosphate, 1 to 40% by weight of pigment, 1 to 60% by weight of a carrier material, and 1 to 20% by weight of a stabilizer, wherein the weight percentages are based on the total weight of the composition and wherein the chitin inhibitor is micro-encapsulated in a resin polymer.

2. The paint composition of claim 1 wherein said resin is an element selected from the group consisting of vinylic emulsion and acrylic emulsion.

3. The paint composition of claim 1 wherein said chitin inhibitor is an element selected from the group consisting of flufenoxuron, fenoxycarb, hexythiazox, diflubenzuron, hexaflumuron, triflumuron, and hydroprene.

4. The paint composition of claim 3 wherein said organophosphorate is an element selected from the group consisting of ethyl chlorpyridylphosphate, 0,0-diethyl thiophosphate, 0-(3,5, 6-trichloro-2-pyridyl) thiophosphate, 0,0-diethyl, 0-(2-isopropyl-6-methyl-pyrimidin-4-ethyl) phophorothioate.

5. The paint composition of claim 4 wherein said pigment is titanium oxide.

6. The paint composition of claim 4 wherein said carrier material is calcium carbonate.

7. The paint composition of claim 1 wherein said stabilizer is an element selected from the group consisting of sodium benzoate, sodium hexametaphosphate and sodium nitrite.

8. A paint composition for controlling pests and allergens through an inhibitor of chitin synthesis and having residual efficacy, comprising:

a mixture of 10 to 40% by weight of water, 5 to 50% by weight of resin,
0.001 to 40% by weight of a chitin inhibitor,
0.001 to 5% by weight of an organophosphate,
1 to 40% by weight of pigment,
1 to 60% by weight of a carrier material, and
1 to 20% by weight of a stabilizer,
wherein the weight percentages are based on the total weight of the composition and wherein the chitin inhibitor is micro-encapsulated in a resin polymer.